No. 761,834. PATENTED JUNE 7, 1904.
H. A. HECKER.
IRONING MACHINE.
APPLICATION FILED NOV. 9, 1903.

NO MODEL. 2 SHEETS—SHEET 1.

Witnesses
William H. James.
A. S. Tyler

Inventor
Hugo A. Hecker
by Alfred M. Allen
Attorney

No. 761,834. Patented June 7, 1904.

UNITED STATES PATENT OFFICE.

HUGO A. HECKER, OF BELLEVUE, KENTUCKY, ASSIGNOR TO THE WATKINS LAUNDRY MACHINERY COMPANY, OF CINCINNATI, OHIO, A CORPORATION OF OHIO.

IRONING-MACHINE.

SPECIFICATION forming part of Letters Patent No. 761,834, dated June 7, 1904.

Application filed November 9, 1903. Serial No. 180,444. (No model.)

*To all whom it may concern:*

Be it known that I, HUGO A. HECKER, a citizen of the United States, residing in Bellevue, county of Campbell, and State of Kentucky, have invented certain new and useful Improvements in Ironing-Machines, of which the following is a full, clear, and exact description, reference being had to the accompanying drawings, forming part of this specification.

My invention consists of a certain novel and useful construction and arrangement of parts, to be hereinafter and particularly pointed out and claimed, whereby the adjustable ironing-table may be driven by gearing which shall at all times remain in mesh, no matter what the adjustment of the ironing-table may be, whether in close contact with the ironing-roll or removed therefrom, to release the goods or to accommodate varying thicknesses of material.

There are other special novel features of construction to be also pointed out and claimed.

Figure 1:
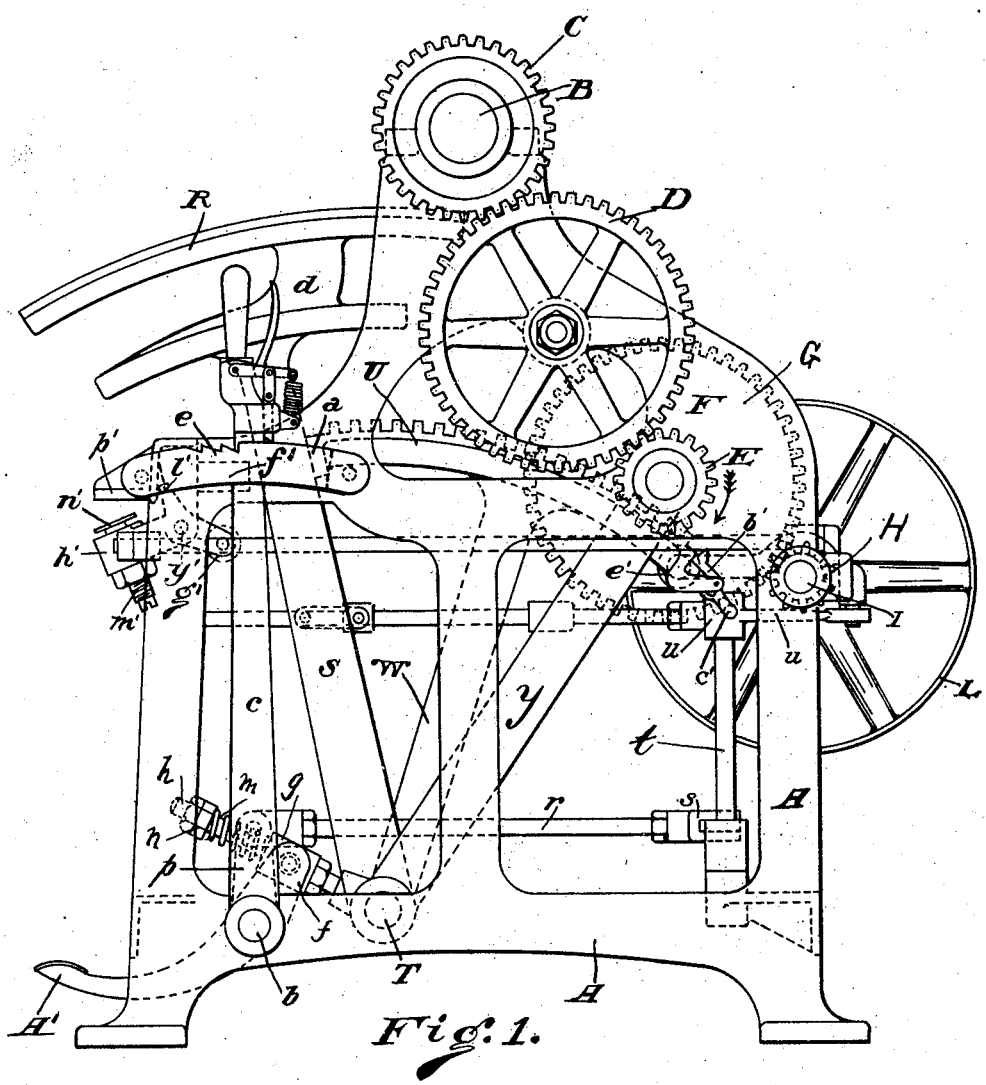
Figures 2, 3:
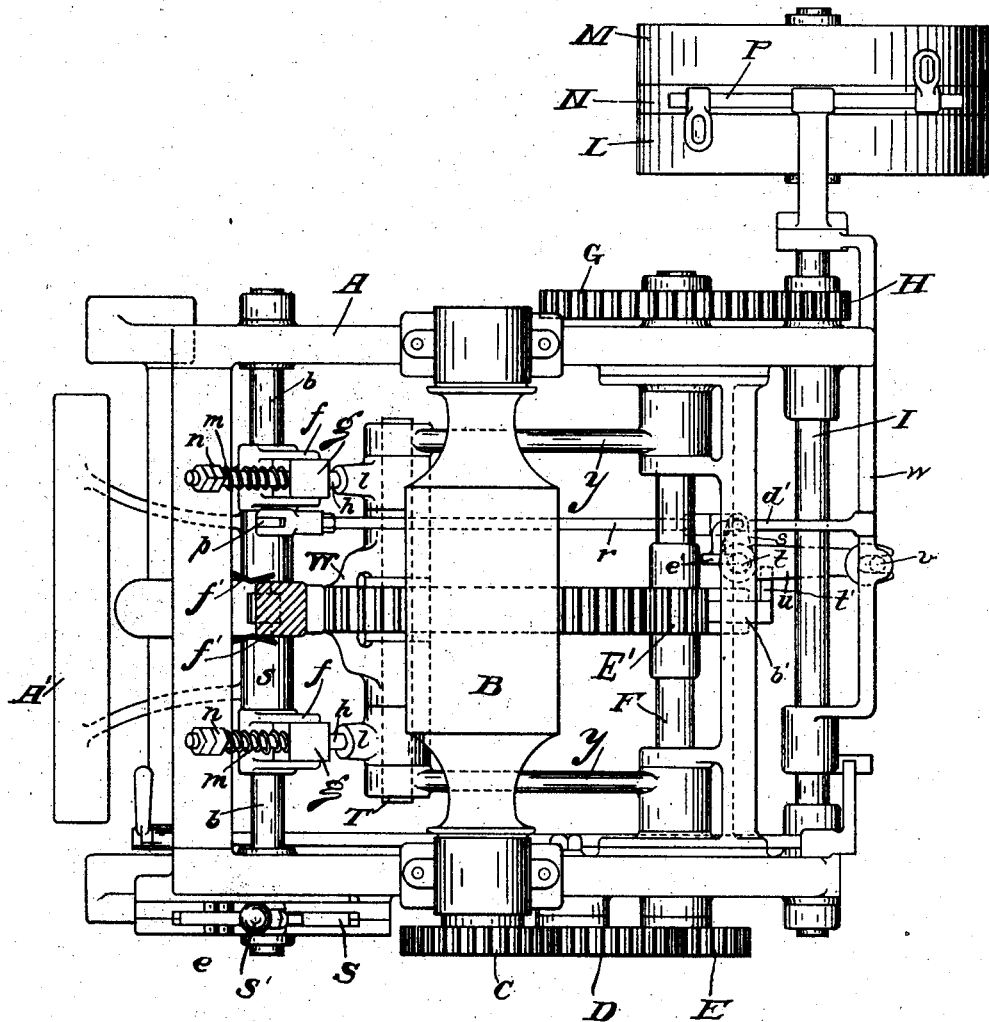

In the drawings, Figure 1 is a side elevation of my improved machine. Fig. 2 is a top plan view of same with the ironing-table removed. Fig. 3 is a detail view showing the loose-tooth construction for the segment-gear.

A A are side standards for supporting the operative mechanism, which standards, together with suitable cross-bars, form a solid and substantial framework for the machine.

B is the ironing-roller, heated in the usual way and mounted in suitable journal-boxes on the top of the side standards. The ironing-roller is driven by the gear C, which meshes with the idler-gear D, which is in turn driven by the pinion E, mounted on the shaft F, journaled in suitable bearings and extending across the frame of the machine. This shaft F carries on the other side of the machine the gear G, which in turn meshes with the pinion H on the driving-shaft I of the machine. This driving-shaft is provided with the two loose pulleys L M and the tight pulley N, which loose pulleys carry, respectively, a straight and a crossed belt, while P is an ordinary belt-shifter for shifting either belt onto the tight pulley to drive the machine in opposite directions.

R is a segmental ironing-table supported by the standard S, journaled at its lower end on the swinging shaft T.

U is a segment-gear securely bolted to the standard S of the ironing-table at *a*. This segment-gear is supported by the standard W, bifurcated below and mounted on the swinging shaft T. This segment-gear meshes with the pinion E', mounted at the middle of shaft F, and is reciprocated by the revolution of the pinion, carrying with it the ironing-table R. The shaft F is also coupled to the swinging shaft T at each end by the links Y Y, so that no matter into what position the shaft T may be swung the distance between the centers of the shafts F T shall remain constant, and therefore the segment-gear U always continues in mesh with its driving-pinion E'.

*b* is a rock-shaft journaled across the lower portion of the frame, carrying the hand-lever *c* for rocking same, which lever is provided with the usual hand-latch *d* to engage the toothed plate *e* for securing same in various positions of adjustment. This rock-shaft *b* carries a pair of bifurcated arms *f f*, between the forks of which are pivoted on trunnions the square blocks *g g*.

*h h* are pins secured to bosses on the collars *l l*, loosely mounted on the swinging shaft T. These pins *h h* pass loosely through central perforations in the blocks *g g*, while *m m* are spiral springs bearing between the nuts *n n* on the outer end of the pins and the blocks *g g*, so that a tension is maintained in this way between the rock-shaft *b* and the swinging shaft T. It will be evident from this construction that by rocking the rock-shaft *b* with the hand-lever *c* the swinging shaft T can be swung in either direction to raise and lower the ironing-table R and that the pressure of the ironing-table on the ironing-roller will be maintained against the tension of the springs *m m*, and it will also be evident that no matter what position may be given the swinging shaft T in raising and lowering the ironing-table the segment-gear U will be maintained in mesh with its driving-pinion E'.

A' is a foot-lever pivoted on the shaft $b$ and carrying an arm $p$, connected by the connecting-rod $r$ to the arm $s$, mounted horizontally on the lower end of the vertical shaft $t$, which carries at its upper end the arm $u$, bifurcated at its outer end and engaging a pin $v$ on the rod $w$. This rod $w$ is connected with the belt-shifter P, so that by operating the foot-lever A' the shaft $t$ is rocked through the movement of the arm $p$ and rod $r$ to reciprocate the arm $u$ to slide the rod $w$ and shift either belt from its loose pulley to the tight pulley to drive the machine in either direction.

$b'$ is a loose tooth pivoted on the outer end of the segment-gear U to form the last tooth in the gear, the tooth being normally held in line with the other teeth by its weighted end $c'$. When the pinion E' is running in the direction of the arrow in Fig. 1 and the segment-gear reaches the end of its stroke, this loose tooth $b'$ is pressed out of the way by each succeeding pinion-tooth without actuating the segment-gear U; but when the pinion is rotated in the opposite direction this loose tooth meshes with the pinion-teeth and the segment-gear is moved to bring its teeth into mesh with the pinion. Ordinarily this loose tooth makes considerable noise as the tooth meets each successive tooth of the pinion when the segment-gear is in its forward position at the end of its stroke with the outer belt carried by the pulley M on the tight pulley N. In order to prevent this clicking noise when the mechanism is still in operation, I mount on the shifter-rod $w$ an arm $d'$, which carries on its outer end a roller $e'$. When the shifter-rod is moved to throw the outer belt onto the tight pulley, the roller $e'$ is brought into the pathway of a pin $t'$, extending laterally from the rear end of the loose tooth $b'$, so that when the segment-gear reaches the limit of its stroke the pin $t'$ will ride up on the roller $e'$, depressing the tooth $b'$ and preventing its contact with the teeth of the pinion. When the belt-shifter rod $w$ is shifted to change the rotation of the driving-pinion in the opposite direction, the roller $e'$ is in turn shifted out of the way, so that the loose tooth will be raised by its weighted end to take hold of the pinion at the proper time.

When the segment-gear U reaches the end of its stroke, and with it the ironing-table R is carried from under the ironing-roller, the standard S of the ironing-table is checked in its movement by the side springs $f'$ $f'$, extending out from the frame on each side of the standard. The standard then strikes against the roller $g'$, mounted on the inner arm of a stop-block $h'$, pivoted at $y'$ in the frame. This stop-block is weighted on its outer arm, so that the nose $l'$ normally rests in contact with the frame; but when the roller $g'$ is struck by the standard S in its outer movement the stop-block is oscillated, bringing the stop-plate $n'$ of the stop-block in contact with the projecting flange $p'$ of the frame, and thus stopping the ironing-table.

$m'$ is a set-screw by which the amount of throw of the stop-block may be regulated by adjusting the position of the stop-plate $n'$ in order to bring the loose tooth $b'$ in the correct position to engage the pinion E'.

Having thus described my invention, what I claim, and desire to secure by Letters Patent, is—

1. In an ironing-machine, the combination of a rotating ironing-roller, and a reciprocating ironing-table, a swinging shaft upon which said ironing-table is mounted, a rock-shaft with cranks to which said swinging shaft is coupled, and a lever for operating said rock-shaft, a segment-gear secured to and concentric with the ironing-table support, a pinion and shaft for driving said segment-gear, and links pivotally connecting said pinion-shaft with the swinging shaft, substantially as shown and described.

2. In an ironing-machine, the combination of a rotating ironing-roller, and a reciprocating ironing-table, a swinging shaft upon which said ironing-table is mounted, a rock-shaft with cranks to which said swinging shaft is coupled, and a lever for operating said rock-shaft, a segment-gear secured to the ironing-table support and mounted on said swinging shaft, a pinion and shaft for driving said segment-gear, and links pivotally connecting said pinion-shaft with the swinging shaft, substantially as shown and described.

3. In an ironing-machine, the combination of a rotating ironing-roller, and a reciprocating ironing-table, a swinging shaft upon which said ironing-table is mounted, a rock-shaft with cranks thereon, spring connection therefor with said swinging shaft, and a lever for operating said rock-shaft, a segment-gear secured to and concentric with the ironing-table support, a pinion and shaft for driving said segment-gear, and links pivotally connecting said pinion-shaft with the swinging shaft, substantially as shown and described.

4. In an ironing-machine, the combination of a rotating ironing-roller, and a reciprocating ironing-table, of a segment-gear secured to said table, and a pinion with driving mechanism therefor, said segment-gear having a loose tooth at its inner end, a belt-shifting device for reversing the rotation of said driving-pinion, the said belt-shifting device carrying an arm to contact with said loose tooth and hold it out of the pathway of the pinion when rotating in one direction, and to release the tooth to engage said pinion when the movement of the pinion is reversed, substantially as shown and described.

5. In an ironing-machine, the combination with a reciprocating ironing-table, and means for oscillating the ironing-table, of side springs to embrace the ironing-table support, and check its movement when released by the oscillating means, and a stop-block pivoted to the frame, carrying a roller with which said ironing-table support contacts, when checked by the springs, and an adjustable stop-plate on said stop-block to contact with the frame and stop the ironing-table, substantially as shown and described.

HUGO A. HECKER.

Witnesses:
CHAS. W. NIEDHAMER,
WM. C. PEIRCE.